US009189872B2

(12) United States Patent
Esfahbod Mirhosseinzadeh Sarabi et al.

(10) Patent No.: US 9,189,872 B2
(45) Date of Patent: Nov. 17, 2015

(54) BEZIER ARC APPROXIMATION SPRING SYSTEM

(71) Applicants: Seyed Behdad Esfahbod Mirhosseinzadeh Sarabi, Toronto (CA); Maysum Panju, Richmond Hill (CA)

(72) Inventors: Seyed Behdad Esfahbod Mirhosseinzadeh Sarabi, Toronto (CA); Maysum Panju, Richmond Hill (CA)

(73) Assignee: Google Inc., Mountain View, CA (US)

( * ) Notice: Subject to any disclaimer, the term of this patent is extended or adjusted under 35 U.S.C. 154(b) by 242 days.

(21) Appl. No.: 13/841,914

(22) Filed: Mar. 15, 2013

(65) Prior Publication Data

US 2015/0193953 A1   Jul. 9, 2015

Related U.S. Application Data

(60) Provisional application No. 61/713,337, filed on Oct. 12, 2012.

(51) Int. Cl.
*G06T 11/20* (2006.01)
*G06F 17/17* (2006.01)

(52) U.S. Cl.
CPC ............... *G06T 11/203* (2013.01); *G06F 17/17* (2013.01)

(58) Field of Classification Search
USPC ........................................................ 345/442
See application file for complete search history.

(56) References Cited

U.S. PATENT DOCUMENTS 5,673,371 A * 9/1997 Koopman et al. ............ 358/1.11

OTHER PUBLICATIONS

Ahn, Young Joon, Hong Oh Kim, and Kyoung-Yong Lee. "G1 arc spline approximation of quadratic Bézier curves." Computer-Aided Design 30.8 (1998): 615-620.*
Riškus, Aleksas. "Approximation of a cubic Bézier curve by circular arcs and vice versa." Information Technology and control 35.4 (2006): 371-378.*
Wang, Wenping, Helmut Pottmann, and Yang Liu. "Fitting B-spline curves to point clouds by curvature-based squared distance minimization." ACM Transactions on Graphics (ToG) 25.2 (2006): 214-238.*

* cited by examiner

*Primary Examiner* — Devona Faulk
*Assistant Examiner* — Diane Wills
(74) *Attorney, Agent, or Firm* — McDermott Will & Emery LLP

(57) ABSTRACT

In one aspect, the present disclosure can be embodied in a method that includes dividing a Bezier curve representing a portion of a vector image to be rendered on a display of a computing device into a set of curve segments. Each of the curve segments is approximated using a circular arc from a set of circular arcs. An approximation error for each of the curve segments is determined. A spring constant is calculated as a function of the respective approximation error determined for each of the curve segments in the set of curve segments. The spring constant represents a relative magnitude of the respective approximation errors calculated for the approximated curve segments. The lengths of curve segments are adjusted based on the respective spring constant calculated for each curve segment in the set of curve segments.

20 Claims, 6 Drawing Sheets

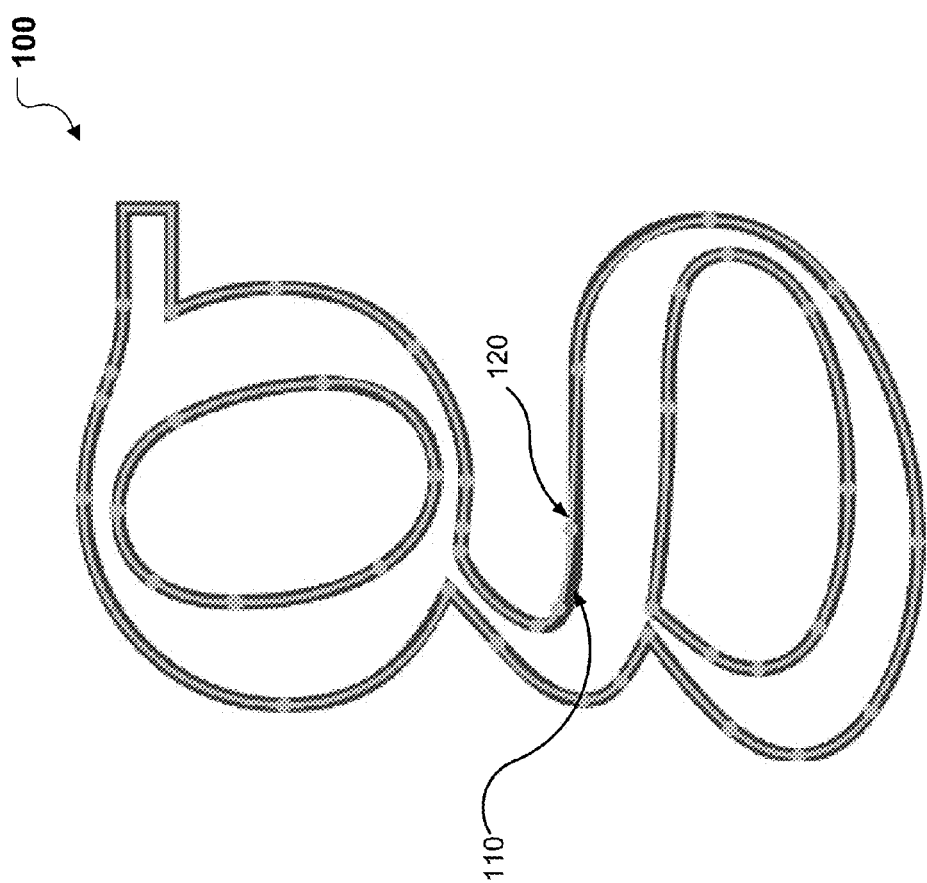

BEZIER ARC APPROXIMATION SPRING SYSTEM

CROSS-REFERENCE TO RELATED APPLICATIONS

The present application claims priority benefit under 35 U.S.C. §119(e) from U.S. Provisional Application No. 61/713,337, titled "BEZIER ARC APPROXIMATION SPRING SYSTEM" and filed on Oct. 12, 2012, which is incorporated herein by reference in its entirety.

BACKGROUND

The present disclosure relates generally to digital imaging and computer graphics, and particularly, to rendering vector image data on a display.

Bezier curves are parametric curves that are generally used in computer graphics applications to model smooth curves with a more simplified geometric definition. A Bezier curve may be defined using an equation or function based on the type of the curve and, thus, the number of control points defining a shape of the curve. However, the use of some Bezier curves may not be ideal for some graphics operations. For example, it may be difficult to calculate a relatively accurate distance from a given point in space to a Bezier curve, particularly with respect to a cubic or higher-order Bezier curve, an operation performed in various types of applications, e.g., applications for rendering vector graphics or tracking the movement of a pointer device between different points of a user interface. This is primarily due to the relative complexity of equations defining such Bezier curves. It may be possible to simplify operations involving a Bezier curve further by approximating the Bezier curve with one or more circular arcs, as the equations defining circular arcs are relatively less complex and thus, may require fewer calculations. However, as Bezier curves have varied curvatures that generally do not resemble circular arcs, the approximation of a Bezier curve or curve segment with a circular arc generally produces some degree of error that may need to be estimated, e.g., for purposes of generating more accurate approximations.

SUMMARY

The disclosed subject matter relates to rendering a vector graphics image based on a dynamic spring-based approximation of the image's shape using multiple circular arcs. In one aspect, the present disclosure can be embodied in a method that includes dividing a Bezier curve representing a portion of a vector image to be rendered on a display of a computing device into a set of curve segments. Each of the curve segments is approximated using a circular arc from a set of circular arcs. An approximation error for each of the curve segments is determined. A spring constant is calculated as a function of the respective approximation error determined for each of the curve segments in the set of curve segments. The spring constant represents a relative magnitude of the respective approximation errors calculated for the approximated curve segments. The lengths of curve segments are adjusted based on the respective spring constant calculated for each curve segment in the set of curve segments. The vector graphics image is then rendered based on the adjusted lengths of the curve segments of the Bezier curve.

Other aspects can be embodied in corresponding systems, apparatus, including computer program products.

It is understood that other configurations of the subject technology will become readily apparent from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The novel features of the subject technology are set forth in the appended claims. However, for purpose of explanation, several embodiments of the subject technology are set forth in the following figures.

FIG. 1 shows an example glyph and an outline of the glyph comprising Bezier curve segments approximated using circular arcs.

DETAILED DESCRIPTION

Figure 2A:
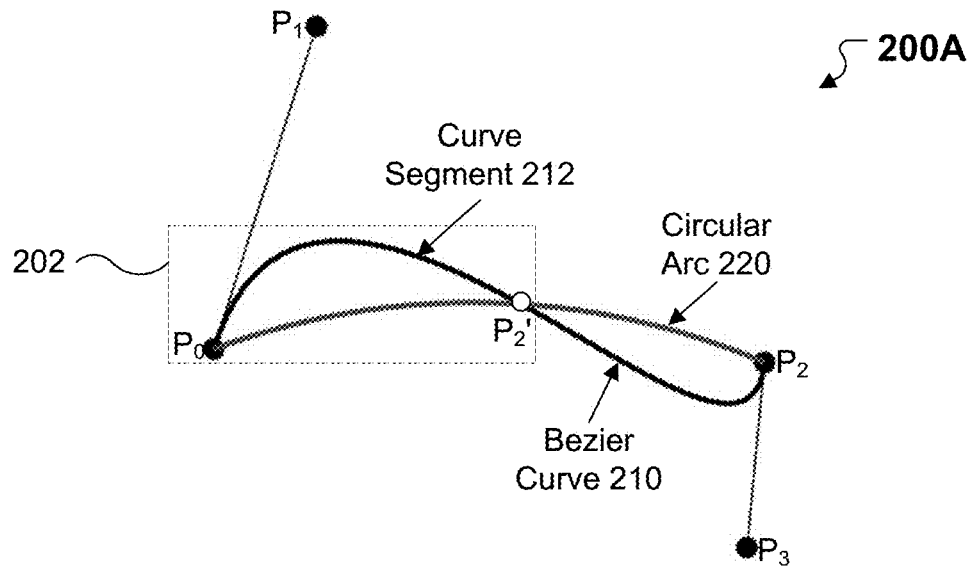
FIG. 2A shows an example cubic Bezier curve having four control points and a circular arc for approximating at least a portion of the Bezier curve.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details.

The disclosed subject matter relates to rendering a vector graphics image based on a dynamic spring-based approximation of the image's shape using multiple circular arcs. In an example, the shape of the image is defined a curved outline of the vector graphics image is defined by a set of Bezier curves. One or more of these Bezier curves may be approximated by first dividing the curve into multiple segments and approximating each segment individually using a circular arc. To improve the accuracy of the approximation, a dynamic physical spring-based technique is used to adjust the particular segments produced by the division based on a relative approximation error determined for each approximation of a respective curve segment using a circular arc. As will be described in further detail below, this technique may include adjusting the length of one or more Bezier curve segments by shifting segment endpoints in a manner similar to the stretches and compressions in a series of physical springs connected to one another (e.g., where each spring represents a different segment).

The vector graphics image to be rendered on the display may be, for example, a text character or symbol. In an example, the text character or symbol is in the form of a glyph, e.g., a graphical representation of the character or symbol in accordance with a particular typeface or font definition. Thus, the techniques described herein may be used in text rendering applications for improving the quality of the rendered text including text rendered in combination with other graphics data (e.g., geographic information for a digital mapping application). However, it should be noted that the techniques described herein are not intended to be limited to rendering text and may be used for rendering other types of vector graphics images including, but are not limited to, graphical icons or graphics models incorporating curved shapes or patterns.

FIG. 1 illustrates an example glyph 100 for the letter 'g' of the English alphabet. In some implementations, an outline 110 of the original glyph is approximated using a set of circular arcs to form an approximated glyph outline 120. In this example, outline 110 corresponding to the shape of the original glyph is defined by a set of Bezier curves. Each Bezier curve of outline 110 is approximated using a circular arc. The set of circular arcs corresponding to the set of Bezier curves of the original glyph form an outline 120, as shown in FIG. 1. Accordingly, outline 120 in this example represents an approximation of outline 110 using a set of circular arcs.

In a further example, a Bezier curve or portion of outline 110 of glyph 100 having varied curvature is divided into two or more curve segments. The Bezier curve may be divided such that each curve segment has, for example, a relatively constant curvature. In some implementations, the Bezier curve is divided into two or more curve segments of equal length. The segments of the divided Bezier curve may be approximated individually using, for example, a circular arc having the same endpoints as the respective curve segment, as shown in the example of FIG. 2A.

FIG. 2A shows an example approximation 200A of a Bezier curve 210 using a circular arc 220. Bezier curve 210 in this example is a cubic Bezier curve whose shape is defined by four control points ($P_0$, $P_1$, $P_2$ and $P_3$). The four control points may correspond to, for example, different parameters of a parametric function defining the curvature or shape of Bezier curve 210. Such a function may be represented using, for example, the following polynomial equation:

$$(1-t)^3 P_0 + 3t(1-t)^2 P_1 + 3t^2(1-t)P_2 + t^3 P_3$$

where a parameter t may have values ranging between 0 and 1 and the sum of all polynomial coefficients corresponding to the respective four control points is equivalent to 1. Using the above polynomial equation, the shape or curvature of Bezier curve 210 may be adjusted by, for example, changing one or more parameter values for different control points defining the shape of Bezier curve 210.

As shown in FIG. 2A, control points P0 and P2 represent the endpoints of Bezier curve 210. Also, as shown in FIG. 2A, the endpoints P0 and P2 are shared between circular arc 220 and Bezier curve 210. To improve the accuracy of approximation 200A in this example, Bezier curve 210 may be divided into multiple curve segments. In this example, Bezier curve 210 is divided at a midpoint P2' located between endpoints P0 and P2, thereby producing two curve segments of equal length. However, it should be noted that the techniques described herein are not limited to Bezier curve segments of equal length and that Bezier curves may be divided at different points to produce curve segments of varying lengths.

Figure 2B:
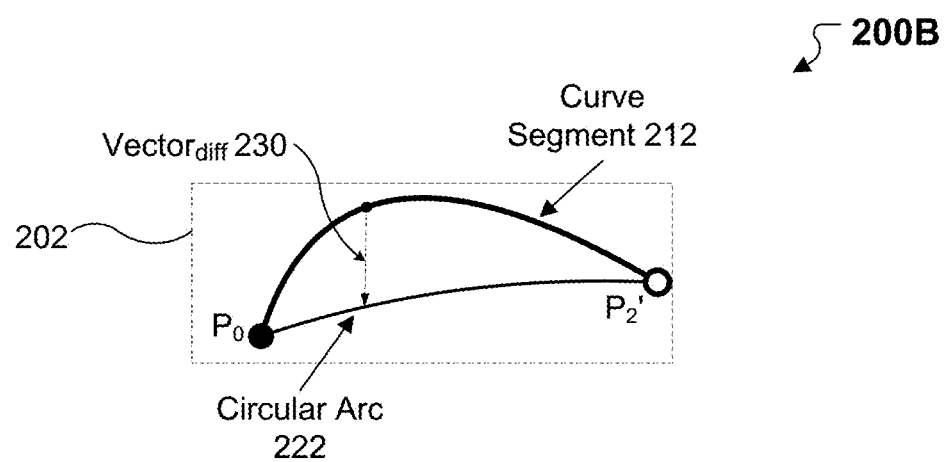
FIG. 2B shows a segment of the Bezier curve and corresponding portion of the circular arc of FIG. 2A.

FIG. 2B shows an example approximation 200B of a curve segment 212 corresponding to a portion 202 of Bezier curve 210 of FIG. 2A, following the division of Bezier curve 210 into multiple curve segments. As shown in FIG. 2B, curve segment 212 is approximated using a circular arc 222. Circular arc 222 may represent, for example, a segment of circular arc 220 of FIG. 2A corresponding to portion 202 or curve segment 212 of Bezier curve 210. However, circular arc 222 is not limited thereto and may represent a new circular arc used to approximate curve segment 212. In some implementations, an approximation error may be estimated for the approximation based on a maximum distance between points on curve segment 212 and corresponding points on circular arc 222 in a two-dimensional region of coordinate space. As shown in FIG. 2B, the distance between a point on curve segment 212 and the corresponding point on circular arc 222 may based on, for example, a difference vector 230 connecting these two points in the two-dimensional region of space.

The region of space may correspond to, for example, an area of a display screen of a computing device to which the portion of the vector graphics image, as represented by the Bezier curve or curve segment being approximated, is to be displayed or rendered. Thus, the two-dimensional region of space may represent a two-dimensional grid of pixels of such a display screen. Further, different points on the Bezier curve within the two-dimensional region of space may correspond to different pixels of the two-dimensional grid of pixels. The vector graphics image in this example may be, for example, a glyph or outline thereof (e.g., glyph outline 110 of glyph 100 of FIG. 1, as described above) to be rendered on the display screen of a computing device. As such, the techniques described herein may be used in various text rendering applications. However, as noted previously, these techniques are not limited thereto and thus, may be used in other types of rendering applications, e.g., for rendering any vector graphics images comprising Bezier curves that define the shape or outline of the image. As will be described in further detail below, a spring-based approximation technique may be used to improve the efficiency of the approximation.

Figure 3:
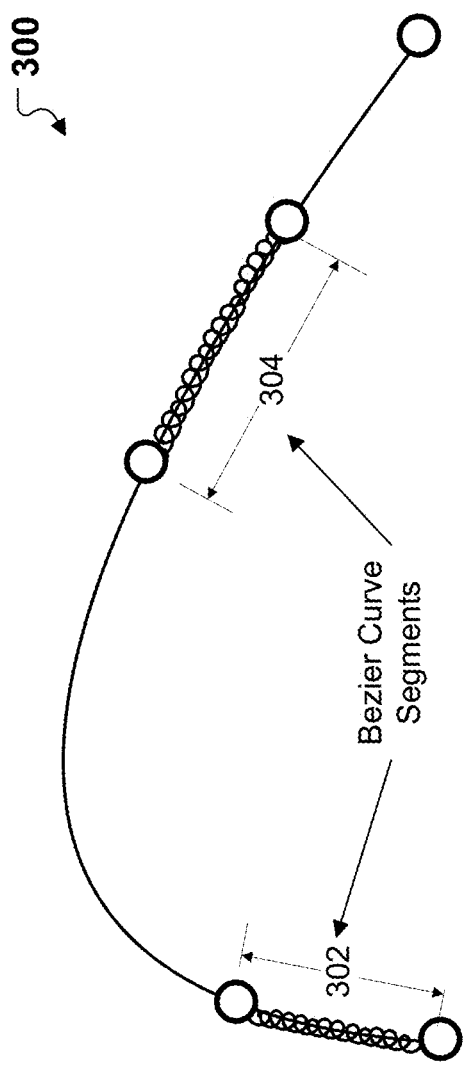
FIG. 3 shows an example Bezier curve having multiple curve segments that may be adjusted to minimize approximation error, without increasing the number of curve segments and circular arcs used to approximate the Bezier curve.

FIG. 3 shows an example Bezier curve 300 having multiple curve segments that may be adjusted to minimize approximation error, without increasing complexity, e.g., by increasing the number of circular arcs (and curve segments) used to approximate Bezier curve 300. For example, the respective lengths of the curve segments of Bezier curve 300 may be adjusted by shifting one or more of the endpoints corresponding to one or more of curve segments 302 and 304. In some implementations, segment lengths are adjusted (e.g., by shifting segment endpoints to increase or decrease length) based on a relative magnitude of the approximation error determined for each of the individual curve segments approximated using a circular arc. Further, the amount to adjust each curve segment may be determined based on, for example, a dynamic spring-based technique, as noted above. As will be described in further detail below, applying such a technique to the various curve segments enables the shifting of segment endpoints to function in a similar manner as the stretches and compressions in a series of connected springs (e.g., where each spring represents a different segment).

Further, an equilibrium state for segment lengths or endpoints may be used to determine a new segmentation scheme for Bezier curve 300 (e.g., by further shifting endpoints of segments 302 or 304) so as to achieve an improved total approximation error over all curve segments. In an example, Bezier curve 300 may be adaptively divided/segmented by shifting segment endpoints using the dynamic spring-based technique, as described above, in an iterative process. This process may be repeated until the approximation errors converge, for example, so as to be within a desired total approximation error tolerance limit. It should be noted that any one or a combination of various approaches may be used to determine the particular points at which the Bezier curve is divided into curve segments. Examples of such approaches may include, but are not limited to, performing binary searches for segmentation points on the Bezier curve, dynamically programming the location of such points for the system or using various specialized functions to model the spring-based system.

Figure 4:
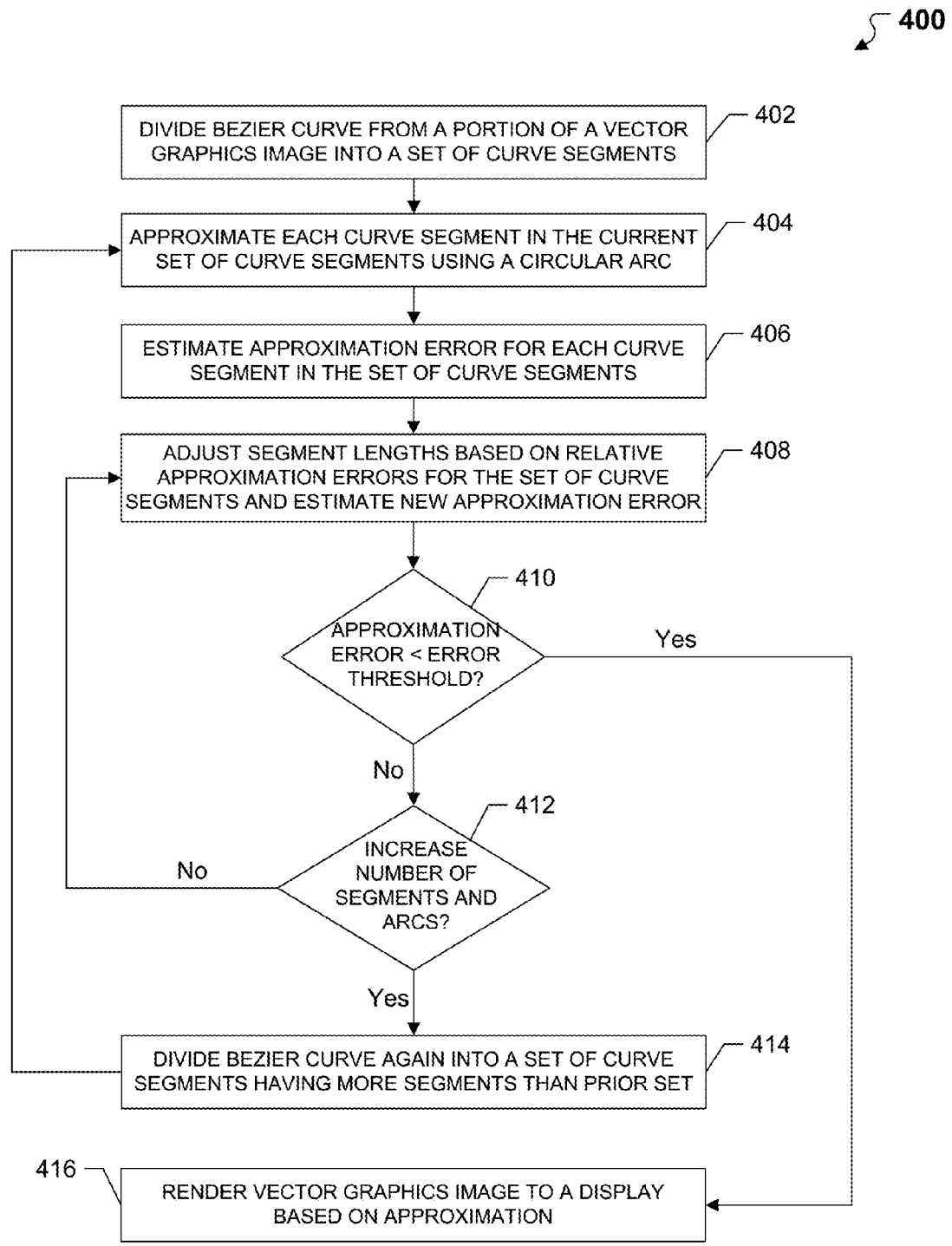
FIG. 4 is a process flow chart of an example method for rendering a vector graphics image based on a dynamic spring-based approximation of the image's shape using multiple circular arcs.

FIG. 4 is a process flow chart of an example method 400 for rendering a vector graphics image or portion thereof (e.g., Bezier curve 300 of FIG. 3, described above) based on a dynamic spring-based approximation of the image's shape using multiple circular arcs. Method 400 may be described using Bezier curve 300 of FIG. 3 for purposes of discussion and is not intended to be limited thereto. Also, for purposes of discussion, method 400 may be described using glyph 100 of FIG. 1 and, as described above, but method 400 is not intended to be limited thereto. The steps of method 400 may be used to apply a dynamic spring-based approximation technique to approximate the varied curvature of a vector graphics image (e.g., outline 110 of glyph 100 of FIG. 1, as described above) defined by one or more Bezier curves. In contrast with conventional solutions, this technique may be used to reduce the error of approximation while still using the same number of circular arcs for the approximation.

Method 400 begins in step 402, which includes dividing a Bezier curve into a set of curve segments. As described above, the Bezier curve may represent a portion of a vector graphics image to be rendered on a display of a computing device. The vector graphics image may be, for example, a text glyph (e.g., glyph 100 of FIG. 1, as described above) representing a text character of a particular type of font supported by a user's computing device. As described above, the region of space may correspond to, for example, a portion of a display screen of the computing device to which the image is to be displayed or rendered upon being reconstructed. Thus, the two-dimensional region of space may represent a two-dimensional grid of pixels of such a display screen. Further, different points on the Bezier curve within the two-dimensional region of space may correspond to different pixels of the two-dimensional grid of pixels.

In step 404, each curve segment in the set of curve segments is approximated using a circular arc. In some implementations, the Bezier curve is divided into two or more equally sized segment. For example, each segment of the divided Bezier curve may be approximated individually using, for example, a circular arc having the same endpoints as the respective curve segment. Once each curve segmented is approximated using a circular arc, method 400 proceeds to step 406, which includes estimating an approximation error for each of the curve segments in the set of curve segments. The approximation error associated with the respective approximations of the individual curve segments (e.g., segments 302 or 304 of Bezier curve 300 of FIG. 3) may be estimated using any of various conventional or other techniques.

The estimated approximation error may be based on an error function, which may be similar to, for example, the parametric function described above with respect to Bezier curve 210 of FIG. 2A. In some implementations, the error function selected for this purpose may provide, for example, an upper bound for the estimated approximation error corresponding to each of the individual segment approximations.

Step 408 includes adjusting the lengths of curve segments based on a relative magnitude of the estimated approximation error for each curve segment in the current set of curve segments using a corresponding second set of circular arcs. The curve segments of the Bezier curve being approximated may be adjusted by, for example, shifting the endpoints of one or more curve segments based on a relative magnitude of the approximation error determined for each of the individual curve segments approximated with circular arcs. In some implementations, the accuracy of the approximation (or estimated amount of approximation error) may be adjusted using various approximation schemes such that the estimated approximation error remains within or does not exceed a desired or predetermined error tolerance or threshold, as used in step 410, discussed further below.

In some implementations, the amount to modify each segment (e.g., by shifting segment endpoints to increase or decrease length) may be calculated using, for example, a dynamic spring-based technique, as discussed above. For example, a spring constant may be calculated for each segment as a function of the approximation error for that segment. The spring constant calculated for the segments may be used in calculating the amount to modify each segment (e.g., by shifting segment endpoints), as noted above. The segment lengths may be modified (or segment endpoints may be shifted) using the calculated spring constants and approximation error tolerance limit in an attempt to achieve a state of equilibrium for the overall spring-based system including the constituent segments of the divided Bezier curve, as described above. Such an equilibrium state may be based on, for example, an average approximation error across the set of curve segments being approximated or a total approximation error representing a sum of the individual segment approximation errors. If the estimated approximation error is determined to be less than a predetermined error tolerance, the vector graphics image (or portion thereof), as represented by the Bezier curve and curve segments, is rendered in step 416 to an area of a display screen of a computing device, as described above.

In the above example, the endpoints of different curve segments may be continuously shifted such that each of the individual curve segment approximations has an absolute approximation error that is within the predetermined error tolerance limit. For example, endpoints of curve segments having relatively large approximation errors (e.g., above the error tolerance limit) may be shifted so as to reduce the approximation errors while endpoints of curve segments having relatively smaller errors may be shifted so as to increase the associated error, as long as the error tolerance limit has not been reached. Shifting the segment endpoints to ensure that none of the individual approximation errors are above the tolerance limit may include modifying the respective length(s) (e.g., either increasing or decreasing length) of one or more curve segments. In this way, the division of the Bezier curve into multiple curve segments may be continually improved or optimized for purposes of approximating the curve segments with the circular arcs.

Further, the above-described steps of method 400 may be performed as part of an iterative process for adaptively dividing and shifting a Bezier curve using the dynamic spring-based approximation technique described herein. This iterative process may be repeated until, for example, it is determined in step 412 that the desired total approximation error tolerance cannot be achieved using the current number of circular arcs and corresponding segments. Such a determination may also be made prior to shifting any segment endpoints (e.g., in step 408) based on, for example, the individual approximation errors determined after the initial segmentation of the Bezier curve (e.g., into two or more equally sized segments, as described previously). For example, it may be determined in step 412 that there are no individual approximation errors that fall below the desired error tolerance limit. In either case (e.g., error tolerance limit exceeded for all of the individual approximation errors prior to shifting segment endpoints or the total approximation error after shifting endpoints), the Bezier curve may be divided/segmented again in step 414 to include additional segments (e.g., of equal size) for approximation using a relatively greater number of circular arcs. The iterative process using the dynamic spring-based approximation technique, as described above, may then be applied to the newly divided Bezier curve with relatively more segments and circular arcs.

Figure 5:
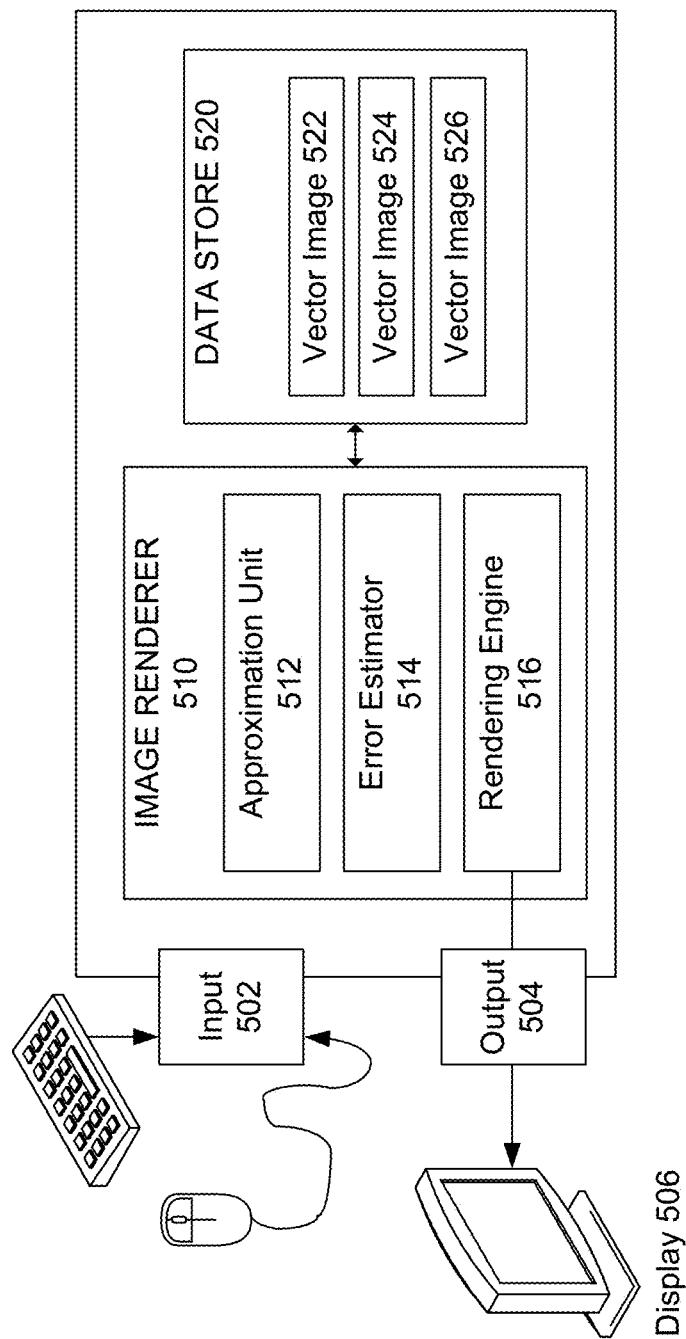
FIG. 5 is a functional block diagram of an example computing system for rendering a vector graphics image based on a dynamic spring-based approximation of the image's shape using multiple circular arcs.

FIG. 5 is a functional block diagram of an example computing system 500 for rendering a vector graphics image based on a dynamic spring-based approximation of the image's shape using multiple circular arcs. For purposes of discussion, system 500 will be described using glyph 100 of FIG. 1 and the Bezier curves and circular arcs illustrated in FIGS. 2A, 2B and 3, respectively, as described above. However, system 500 is not intended to be limited thereto. Further, for purposes of discussion, system 500 may be described using method 400 of FIG. 4, as described above, but system 500 is not intended to be limited thereto. In an example, the steps of method 400 may be implemented using system 500. As shown in FIG. 5, system 500 includes an input interface 502 coupled to one or more user input devices (e.g., mouse, keyboard, etc.), an output interface 504 coupled to a display 506, an image renderer 510 and a data store 520. Further, image renderer 510 includes an approximation unit 512, an error estimator 514 and a rendering engine 516.

System 500 can be implemented using any type of general-purpose or specialized computing device with at least one processor and local memory. Examples of such computing devices may include, but are not limited to, a desktop computer, a laptop computer, a handheld computer, a personal digital assistant (PDA), a cellular telephone, a network appliance, a camera, a mobile handset (e.g., a mobile phone or tablet computer), a media player, a navigation device, an email device, a game console, set-top box, television having a processor and memory for executing and storing instructions or any combination of these or other data processing devices. Additionally, input interface 502 of system 500 may be used to receive input from a user via one or more user input devices including, but not limited to, a QWERTY or T9 keyboard, a mouse or other type of pointing device, a microphone or touch-screen display. Further, output interface 504 may be used to output or display content to display 506. Display 506 may be any type of display device including, for example and without limitation, a cathode ray tube (CRT) monitor, liquid crystal display (LCD) screen or light-emitting diode (LED) display. Display 506 also may be implemented as a touch-screen display capable of receiving user input as well as outputting information to the user. As such, the functionality of interfaces 502 and 504 may be combined into a single input/output interface.

Although not shown in FIG. 5, system 500 may include additional components and device interfaces as may be necessary or desired for a particular implementation. For example, system 500 may also include a network interface (not shown) for communicating information with another computing device or system through a network. Such a network can be any network or combination of networks that can carry data communication. The network may include, but is not limited to, a cellular network, a local area network, medium area network, and/or wide area network, e.g., the Internet, or a combination thereof for communicatively coupling any number of mobile clients, fixed clients, and servers.

Data store 520 can be any type of memory device or recording medium for storing persistent data. Further, data store 520 may be a local data storage device or a remote storage device communicatively coupled to system 500, for example, via a network interface (not shown) of system 500. Data store 520 may be used to store any type of data. As shown in FIG. 5, data store 520 may be used to store vector images 522, 524 and 526. As described above, vector images 502, 504 and 506 may be any of various types of vector graphic images including, but not limited to, computer graphics images or glyphs or portions thereof (e.g., Bezier curves or curve segment data defining a curved outline or boundary of a glyph). The different vector images may be stored, for example, as one or more files in association with an application program executable at system 500.

In some implementations, image renderer 510 may be configured to render vector images 522, 524 or 526 (e.g., text or computer graphics models) to display 506 via a user interface of an application program executable at system 500. The application program may be any of various types of application programs that involve the rendering of text or vector graphics images. Such an application program may be, for example, a client application associated with a mapping service in which geographic information in the forms of text glyphs are rendered along with other graphics data on an interactive map displayed using display 506 for a user at system 500. In this example, the techniques described herein may be used to improve the quality of the rendered text including text rendered in combination with other graphics data. Although not shown in FIG. 5, system 500 may include additional components for implementing different functions of system 500. Such functions may include, for example and without limitation, user interface management functions enabling the user at system 500 to interact with the rendered vector graphics images 522, 524 and 526 for various purposes including, but not limited to, editing, modifying or transforming portions of the rendered images (e.g., editing text rendered to a display in a browser or text editing application).

In some implementations, the interface may be provided as a web interface within, for example, a web browser executable at a client device of the user. In providing such a web interface, computing system 500 may function as a server in a client-server architecture for providing the interface and associated visualizations through a network to a web browser or other application executable at a client device of the user. Such a network can be any network or combination of networks that can carry data communication and can include, but is not limited to, a local area network, medium area network, and/or wide area network such as the Internet. The web version of the interface can be executed as, for example, a script, browser plug-in or other program that executes within the browser or browser plug-in. Further, this web interface may be implemented using any one or a combination of various markup or scripting programming language elements including, but not limited to, Hyper Text Markup Language (HTML) and JavaScript. Like system 500, such a client device may be implemented using any type of general-purpose or specialized computing device with at least one processor and local memory and communicatively coupled to at least one user input device and a display. Examples of such computing devices may include, but are not limited to, a desktop computer, a laptop computer, a handheld computer, a personal digital assistant (PDA), a cellular telephone, a network appliance, a camera, a mobile handset (e.g., a mobile phone or tablet computer), a media player, a navigation device, an email device, a game console or a any combination of these or other data processing devices.

In an example, approximation unit 512 may be configured to approximate a Bezier curve (e.g., Bezier curve 300 of FIG. 3, as described above) defining a portion of a vector graphics image (e.g., glyph outline 110 of glyph 100 of FIG. 1). As described above, approximation unit 512 may be configured to improve the accuracy of this approximation by dividing Bezier curve 210 into segments and each segment may be individually approximated using a circular arc (e.g., circular arc 222 of FIG. 2B) similar to that used for the first approximation.

Error estimator 514 may be configured to estimate an approximation error associated with the above-described first and second approximations may then be used by error estimator 514 to estimate or determine the error associated with approximating the first Bezier curve (e.g., Bezier curve 212 of FIG. 2B) with a circular arc (e.g., circular arc 222 of FIG. 2B). To improve the accuracy of the approximation, a dynamic physical spring-based technique is used to adjust the particular segments produced by the division based on a relative approximation error determined for each approximation of a respective curve segment using a circular arc. As described above, this technique may include adjusting the length of one or more Bezier curve segments by shifting segment endpoints in a manner similar to the stretches and compressions in a series of physical springs connected to one another (e.g., where each spring represents a different segment).

In some implementations, the accuracy of the approximation of the Bezier curve may be improved further by dividing the curve again so as to generate a new set of curve segments having a relatively greater number of segments than the previous set. Each curve segment in the new set may then be approximated using a circular arc as before. As increasing the number of circular arcs generally improves the accuracy of the approximation, the division and approximation of a Bezier curve or curve segment may be steps of an iterative process (e.g., method 400 of FIG. 4, as described above) for reducing the approximation error for each individual curve segment or average approximation error over all the curve segments of the vector graphics image outline being approximated. In some implementations, this iterative process may be repeated until the approximation error for each curve-to-arc approximation is below a predetermined error threshold or tolerance. For example, when the estimated approximation error is determined to be less than the predetermined error tolerance, the vector graphics image (or portion thereof), as represented by the Bezier curve and curve segments being approximated, is rendered by rendering engine 516 to an area of display 506, as described above.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 6:
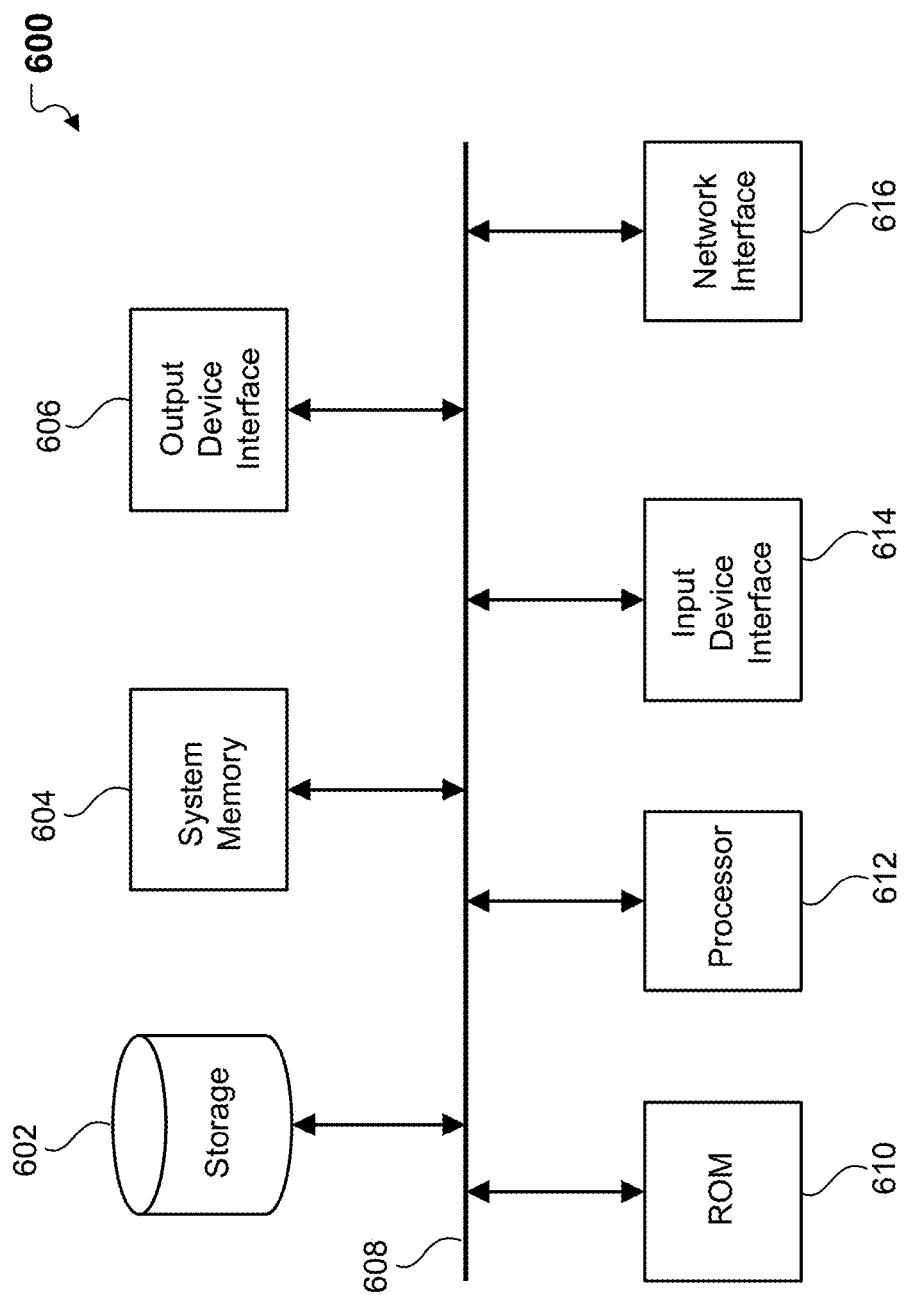
FIG. 6 conceptually illustrates an example electronic system in which portions of the subject technology may be implemented.

FIG. 6 conceptually illustrates an example electronic system 600 with which some implementations of the subject technology are implemented. Electronic system 600 includes various types of computer readable media and interfaces for various other types of computer readable media. As shown in the example of FIG. 6, electronic system 600 includes a bus 608, processing unit(s) 612, a system memory 604, a read-only memory (ROM) 610, a permanent storage device 602, an input device interface 614, an output device interface 606, and a network interface 616.

Bus 608 collectively represents all system, peripheral, and chipset buses that communicatively connect the numerous internal devices of electronic system 600. For instance, bus 608 communicatively connects processing unit(s) 612 with ROM 610, system memory 604, and permanent storage device 602.

From these various memory units, processing unit(s) 612 retrieves instructions to execute and data to process in order to execute the processes of the subject disclosure. The processing unit(s) can be a single processor or a multi-core processor in different implementations.

ROM 610 stores static data and instructions that are needed by processing unit(s) 612 and other modules of the electronic system. Permanent storage device 602, on the other hand, is a read-and-write memory device. This device is a non-volatile memory unit that stores instructions and data even when electronic system 600 is off. Some implementations of the subject disclosure use a mass-storage device (such as a magnetic or optical disk and its corresponding disk drive) as permanent storage device 602.

Other implementations use a removable storage device (e.g., a floppy disk, flash drive or disk drive) as permanent storage device 602. Like permanent storage device 602, system memory 604 is a read-and-write memory device. However, unlike storage device 602, system memory 604 is a volatile read-and-write memory, such a random access memory. System memory 604 stores some of the instructions and data (e.g., vector images 522, 524 and 526 of FIG. 5, as described above) that the processor needs at runtime. In some implementations, the processes of the subject disclosure are stored in system memory 604, permanent storage device 602, and/or ROM 610. For example, the various memory units include instructions for performing the steps of method 400 of FIG. 4, as described above, in accordance with some implementations. From these various memory units, processing unit(s) 612 retrieves instructions to execute and data to process in order to execute the processes of some implementations.

Bus 608 also connects to input and output device interfaces 614 and 606. Input device interface 614 enables the user to communicate information and select commands to the electronic system. Input devices used with input device interface 614 include, for example, alphanumeric keyboards and pointing devices (also called "cursor control devices"). Output device interfaces 606 enables, for example, the display of images generated by the electronic system 600. Output devices used with output device interface 606 include, for example, printers and display devices, such as cathode ray tubes (CRT) or liquid crystal displays (LCD). Some implementations include devices such as a touch-screen that functions as both input and output devices.

Finally, as shown in FIG. 6, bus 608 also couples electronic system 600 to a network (not shown) through a network interface 616. In this manner, the computer can be a part of a network of computers (such as a local area network ("LAN"), a wide area network ("WAN"), or an Intranet, or a network of networks, such as the Internet. Any or all components of electronic system 600 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A computer-implemented method for rendering vector graphics using circular arcs, the method comprising:
   dividing a Bezier curve into a first set of curve segments, the Bezier curve representing a portion of a vector image to be rendered on a display of a computing device;
   approximating each of the curve segments in the first set of curve segments with a different respective circular arc from a first set of circular arcs;
   estimating an approximation error for each of the curve segments in the first set of curve segments;
   calculating a spring constant as a function of the respective approximation error determined for each of the curve segments in the first set of curve segments, wherein the spring constant represents a relative magnitude of the respective approximation errors calculated for the approximated curve segments in the first set;
   adjusting lengths of curve segments in the first set of curve segments of the Bezier curve based on the respective spring constant calculated for each curve segment in the first set of curve segments of the Bezier curve while maintaining a same number of the curve segments in the first set of curve segments of the Bezier curve; and
   rendering the portion of the vector image as represented by the divided Bezier curve to the display of the computing device, based on the adjusted lengths of the curve segments in the first set of curve segments of the Bezier curve.

2. The method of claim 1, wherein each of the curve segments in the first set are of equal size.

3. The method of claim 1, wherein the adjusting step further comprises:
   determining whether the adjusted total approximation error for the first set of curve segments of the divided Bezier curve is below a predetermined total approximation error threshold;
   when the total approximation error is determined not to be below the predetermined total approximation error threshold, dividing the Bezier curve into a second set of curve segments, wherein the second set of curve segments includes at least one additional curve segment than the first set, and
   wherein the approximating, determining, calculating and adjusting steps are repeated for the second set of curve segments.

4. The method of claim 3, wherein the lengths of the curve segments in the first set of curve segments are adjusted to form a second set of curve segments based on the respective spring constant calculated for each of the curve segments in the first set of curve segments, and a total approximation error for the second set of curve segments is relatively less than that of the first set of curve segments, and the total approximation error for the second set of curve segments is determined based on respective approximations of the second set of curve segments using a corresponding second set of circular arcs.

5. The method of claim 4, wherein the adjusting step includes shifting endpoints of the curve segments in the first set to form the second set of curve segments, based on the respective spring constant calculated for each of the curve segments in the first set of curve segments, and the respective approximation error determined for each of the curve segments in the second set of curve segments is below a predetermined approximation error threshold.

6. A non-transitory machine-readable medium comprising instructions stored therein, which when executed by a system, cause the system to perform operations comprising:
   dividing a Bezier curve into a first set of curve segments, the Bezier curve representing a portion of a vector image to be rendered on a display of a computing device;
   approximating each of the curve segments in the first set of curve segments with a different respective circular arc from a first set of circular arcs;
   estimating an approximation error for each of the curve segments in the first set of curve segments;
   adjusting lengths of curve segments in the first set of curve segments of the Bezier curve based on a relative magnitude of the respective approximation error estimated for each curve segment in the first set of curve segments of the Bezier curve while maintaining a same number of the curve segments in the first set of curve segments of the Bezier curve; and
   rendering the portion of the vector image as represented by the divided Bezier curve to the display of the computing device, based on the adjusted lengths of the curve segments in the first set of curve segments of the Bezier curve.

7. The non-transitory machine-readable medium of claim 6, wherein each of the curve segments in the first set are of equal size.

8. The non-transitory machine-readable medium of claim 6, wherein the adjusting step further comprises:
   determining whether the adjusted total approximation error for the first set of curve segments of the divided Bezier curve is below a predetermined total approximation error threshold;
   when the total approximation error is determined not to be below the predetermined total approximation error threshold, dividing the Bezier curve into a second set of curve segments, wherein the second set of curve segments includes at least one additional curve segment than the first set, and
   wherein the approximating, determining, estimating and adjusting steps are repeated for the second set of curve segments.

9. The non-transitory machine-readable medium of claim 8, wherein the system is configured to perform operations further comprising:
   calculating a spring constant as a function of the respective approximation error determined for each of the curve segments in the first set of curve segments.

10. The non-transitory machine-readable medium of claim 9, wherein the spring constant represents a relative magnitude of the respective approximation errors calculated for the approximated curve segments in the first set.

11. The non-transitory machine-readable medium of claim 10, wherein the lengths of the curve segments in the first set of curve segments are adjusted to form a second set of curve segments based on the respective spring constant calculated for each of the curve segments in the first set of curve segments, and a total approximation error for the second set of curve segments is relatively less than that of the first set of curve segments, and the total approximation error for the second set of curve segments is determined based on respective approximations of the second set of curve segments using a corresponding second set of circular arcs.

12. The non-transitory machine-readable medium of claim 11, wherein adjusting the lengths of the curve segments in the first set includes shifting endpoints of the curve segments in the first set to form the second set of curve segments, based on the respective spring constant calculated for each of the curve segments in the first set of curve segments.

13. The non-transitory machine-readable medium of claim 12, wherein the respective approximation error determined for each of the curve segments in the second set of curve segments is below a predetermined approximation error threshold.

14. A system for rendering vector graphics using circular arcs, the system comprising:
   one or more processors;
   a display; and
   a memory device including processor-readable instructions, which when executed by the one or more processors, configure the one or more processors to perform functions to:
      divide a Bezier curve into a first set of curve segments, the Bezier curve representing a portion of a vector image to be rendered on a display of a computing device;
      approximate each of the curve segments in the first set of curve segments with a different respective circular arc from a first set of circular arcs;
      estimate an approximation error for each of the curve segments in the first set of curve segments;
      adjust lengths of curve segments in the first set of curve segments of the Bezier curve based on a relative magnitude of the respective approximation error estimated for each curve segment in the first set of curve segments of the Bezier curve while maintaining a same number of the curve segments in the first set of curve segments of the Bezier curve; and
      render the portion of the vector image as represented by the divided Bezier curve to the display of the computing device, based on the adjusted lengths of the curve segments in the first set of curve segments of the Bezier curve.

15. The system of claim 14, wherein each of the curve segments in the first set are of equal size.

16. The system of claim 14, wherein the processor is further configured to perform functions to:
   determine whether the adjusted total approximation error for the first set of curve segments of the divided Bezier curve is below a predetermined total approximation error threshold;
   when the total approximation error is determined not to be below the predetermined total approximation error threshold, divide the Bezier curve into a second set of curve segments, wherein the second set of curve segments includes at least one additional curve segment than the first set, and
   wherein the functions to approximate, determine, estimate and adjust are repeated for the second set of curve segments.

17. The system of claim 16, wherein the processor is further configured to perform functions to:
   calculate a spring constant as a function of the respective approximation error determined for each of the curve segments in the first set of curve segments.

18. The system of claim 17, wherein the spring constant represents a relative magnitude of the respective approximation errors calculated for the approximated curve segments in the first set.

19. The system of claim 18, wherein the lengths of the curve segments in the first set of curve segments are adjusted to form a second set of curve segments based on the respective spring constant calculated for each of the curve segments in the first set of curve segments, and a total approximation error for the second set of curve segments is relatively less than that of the first set of curve segments, and the total approximation error for the second set of curve segments is determined based on respective approximations of the second set of curve segments using a corresponding second set of circular arcs.

20. The system of claim 19, wherein the function to adjust the lengths of the curve segments in the first set includes a function to shift endpoints of the curve segments in the first set to form the second set of curve segments, based on the respective spring constant calculated for each of the curve segments in the first set of curve segments, and the respective approximation error determined for each of the curve segments in the second set of curve segments is below a predetermined approximation error threshold.

* * * * *